(12) United States Patent
Sasson et al.

(10) Patent No.: US 7,197,524 B2
(45) Date of Patent: Mar. 27, 2007

(54) DIRECT RF SAMPLING FOR CABLE APPLICATIONS AND OTHER BROADBAND SIGNALS

(75) Inventors: Nir Sasson, Ein Sarid (IL); Uri Garbi, Rosh Haain (IL); Naor Goldman, Raanana (IL)

(73) Assignee: Texas Instruments Incorporated, Dallas, TX (US)

( * ) Notice: Subject to any disclaimer, the term of this patent is extended or adjusted under 35 U.S.C. 154(b) by 763 days.

(21) Appl. No.: 10/447,781

(22) Filed: May 29, 2003

(65) Prior Publication Data

US 2004/0243655 A1 Dec. 2, 2004

(51) Int. Cl.
*G06F 17/17* (2006.01)
*H03D 1/00* (2006.01)

(52) U.S. Cl. .................................................... 708/313

(58) Field of Classification Search ................. 708/313
See application file for complete search history.

(56) References Cited

U.S. PATENT DOCUMENTS

| | | | | |
|---|---|---|---|---|
| 6,438,366 B1 * | 8/2002 | Lindfors et al. | ............. | 455/334 |
| 6,487,221 B1 | 11/2002 | Bertrand et al. | | |
| 7,047,264 B2 * | 5/2006 | Kishi | ........................ | 708/313 |
| 2001/0040930 A1 * | 11/2001 | Abbey | ....................... | 375/316 |

FOREIGN PATENT DOCUMENTS

EP   1 235 402 A2   8/2002

* cited by examiner

*Primary Examiner*—Chuong D. Ngo
(74) *Attorney, Agent, or Firm*—Steven A. Shaw; W. James Brady; Frederick J. Telecky, Jr.

(57) ABSTRACT

A sampling method implements direct RF sampling of the down-stream DOCSIS and Euro-DOCSIS cable plant signals present at the customer premises equipment (CPE).

4 Claims, 6 Drawing Sheets

DIRECT RF SAMPLING FOR CABLE APPLICATIONS AND OTHER BROADBAND SIGNALS

BACKGROUND OF THE INVENTION

1. Field of the Invention

This invention relates generally to data communication systems and methods, and more particularly to a method of direct RF signal sampling associated with cable applications and other broadband signals present at the customer premises equipment (CPE).

2. Description of the Prior Art

Data-Over-Cable Service Interface Specifications (DOCSIS) is a standard for data communication over cable TV infrastructure. This standard is published by CableLabs, a North American consortium founded by members of the cable TV industry. DOCSIS 2.0 was published on Dec. 31, 2001, and includes several important modifications to the previous version, 1.1. In cable broadband applications, as well as in other RF applications, it would be both advantageous and beneficial to provide a scheme of direct RF sampling of the down-stream DOCSIS and Euro-DOCSIS cable plant signals present at the customer premises equipment (CPE).

SUMMARY OF THE INVENTION

The present invention is directed to a scheme of direct RF sampling of the down-stream DOCSIS and Euro-DOCSIS cable plant signals present at the customer premises equipment (CPE).

According to one embodiment, a method of sampling an RF input signal comprises the steps of dividing a real RF input signal range into a plurality of regions having equal frequency ranges; sampling and holding the RF input signal in discrete time to provide a periodic extension of the original signal spectrum; selectively translating the sampled RF input signal and generating a desired signal there from, such that the desired signal lies between −equal frequency range and +equal frequency range; filtering the translated RF input signal such that only the desired signal between −equal frequency range and +equal frequency range remains intact; and decimating the filtered RF input signal such that a discrete time analog signal is generated at a first sampling rate.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figures thereof and wherein:

FIG. 3b shows the frequency response for the FIR filter shown in FIG. 3a;

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, the present invention is directed to a scheme of direct RF sampling of the down-stream DOCSIS and Euro-DOCSIS cable plant signals present at the customer premises equipment (CPE). The preferred embodiments described herein below are based on certain basic system assumptions including an input frequency range between 50 MHz and 880 MHz, a maximum total input power of 30 dBmV, a US DOCSIS channel spacing of 6 MHz, and a Euro DOCSIS channel spacing of 8 MHz. The input to the system is assumed to be the full range of the directly sampled signals with no filtering whatsoever. The output of the system consists of samples, that include the desired channel, and may include additional channels (adjacent channels). The remaining channel selections are implemented in the digital domain.

Looking now at FIGS. 1a–1f, a method of direct RF sampling is described in which the input signal is decimated from the full initial sample and hold rate, to the final rate in which the quantization is implemented. The process is completed in a few (~5) nearly identical stages consisting of:

1. complex frequency translation;
2. anti-aliasing filtering; and
3. decimation.

FIGS. 1a–1f illustrate one example wherein the first stage (out of ~5) samples the real, full downstream signal at 2 G samples per second (sps), which then undergoes the series of operations 1–3 above, which subsequently generate a signal sampled at 1 Gsps. It shall be understood this process does not suggest any analog implementation, but merely the signal processing that should be carried out.

Figure 1A:
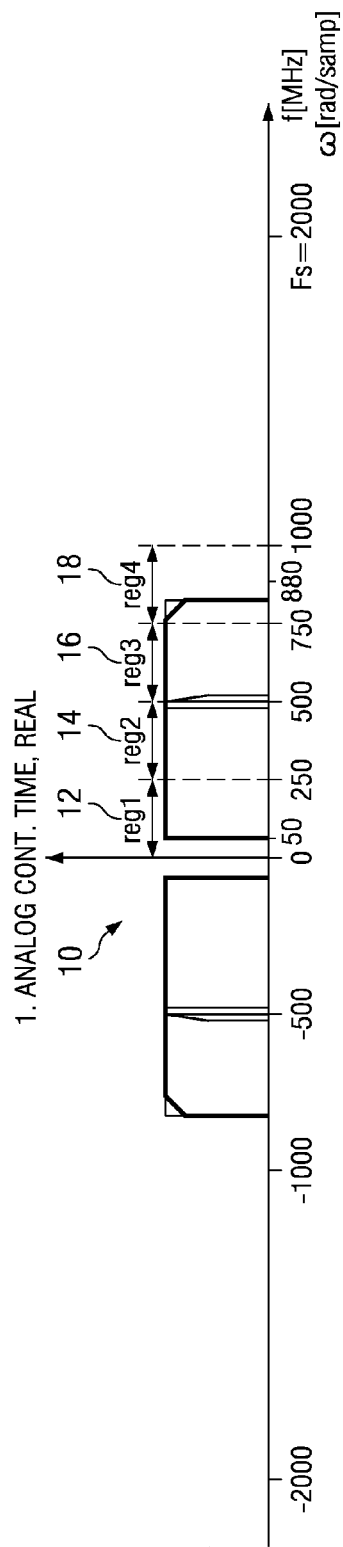
FIG. 1a depicts a real input signal with multiple QAM and NTSC signals, ranging from 50–880 MHz.

The signal processing methodology is described herein below with continued reference now to FIGS. 1a–1f. The original signal 10, shown in FIG. 1a, is a real signal, with multiple QAM and NTSC signals, ranging from 50–880 MHz, as stated herein before. Since the signal is real, it has a symmetric frequency content around 0 Hz. The whole range is divided into four regions (12, 14, 16, 18) in which each region is 250 MHz wide. This division is defined in order to determine the frequency translation required for the desired channel (6 or 8 MHz wide) to come closest to 0 MHz. The example described herein assumes that the desired channel is at 500 MHz. For clarity, the desired channel is shown as a trapezoid.

Figure 1B:
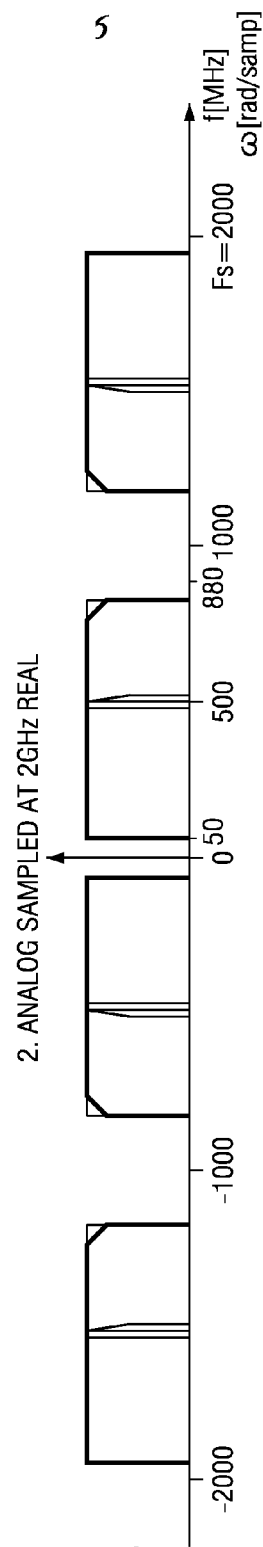
FIG. 1b shows the spectrum of the real input signal shown in FIG. 1a after being sampled and held.

FIG. 1b shows the spectrum of the input signal after being sampled and held. To preserve simplicity and clarity, FIG. 1b does not demonstrate the effects of the integration (integrate and hold) that each sample undergoes, which are discussed herein below. The spectrum of the input signal, once sampled in discrete time, can be seen to be a periodic extension of the original signal's spectrum. The period is the sampling frequency, also referred to as $2\pi$ (in radians per sample) herein below.

Figure 1C:
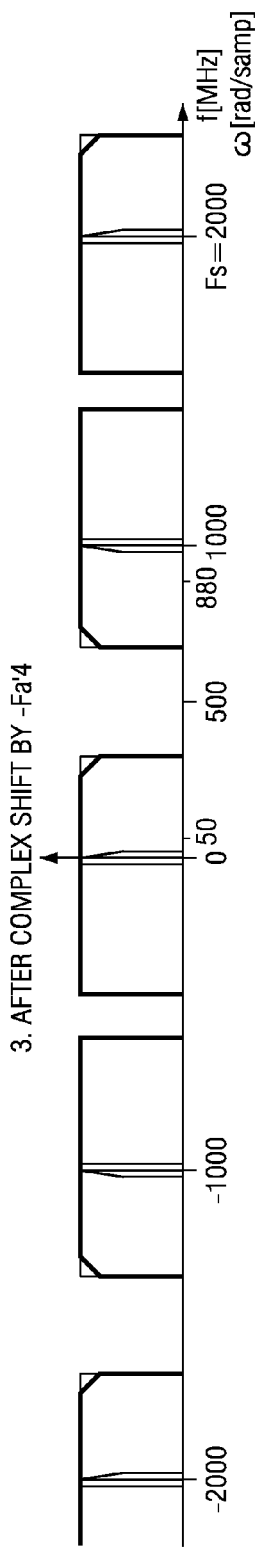
FIG. 1c shows one frequency translation of the sampled signal shown in FIG. 1b.

FIG. 1c shows the frequency translation, that can be one of three (or five) choices including: 1) no translation, if the desired signal is anywhere between 50–250 MHz (region 1); 2) translation by $-\pi/2$ or $+\pi/2$, if the desired signal is between 250–750 (regions 2–3); or 3) translation by $-\pi$ or $+\pi$, if the desired signal is between 750–880 MHz (region 4). The translation is achieved by a very simple operation on the sampled input signal, and is discussed in further detail herein below with reference to FIG. 2. Following this operation, the desired signal is somewhere between $-250$ MHz and $+250$ MHz (or between $-\pi/8$ and $+\pi/8$). For the present embodiment, it can be seen to be at 0 Hz.

Figure 1D:
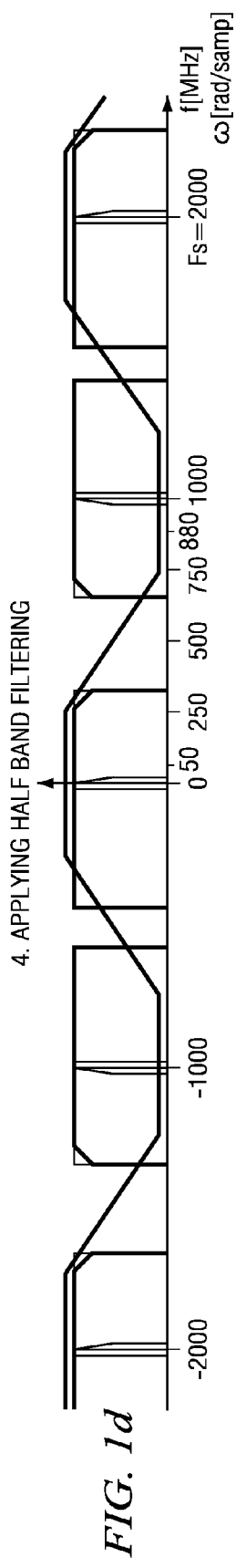
FIG. 1d shows the translated signal shown in FIG. 1c following filtering to avoid aliasing in the subsequent stage.

In order to avoid aliasing in the subsequent stage (where decimation takes place), the signal is filtered in a manner shown in FIG. 1d. This filter leaves the $\pm 250$ MHz range intact, while rejecting everything from 750 MHz and up. A suitable 7-tap filter is later described herein below with reference to FIGS. 3 and 4.

Figure 1E:
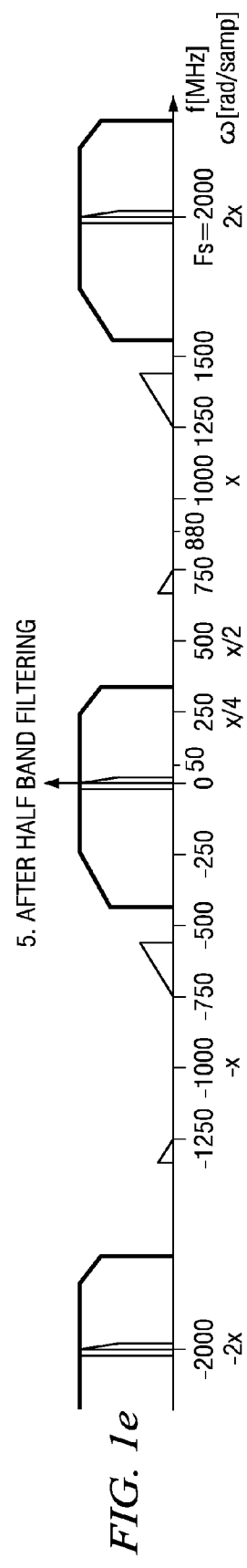
FIG. 1e shows the filtered signal resulting from the filtering process shown in FIG. 1d.
Figure 1F:
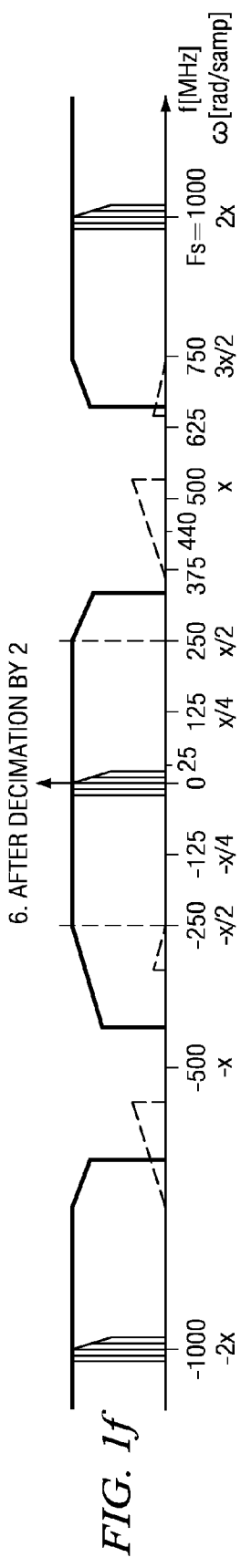
FIG. 1f shows the filtered signal shown in FIG. 1e after decimation by two.

FIG. 1e shows the filtered signal; while FIG. 1f shows the filtered signal after decimation by two. It can be seen that the range of $\pm 250$ MHz is not affected by any aliasing.

The above processing steps described with reference to FIGS. 1a–1f, are then repeated in the next stages, until the sampling rate is such that only about three channels remain. At this point, quantization is performed; and the remaining processing is done in the digital domain. A suitable analog implementation of the first stage is described herein below with reference to FIGS. 5–7.

Figure 2:
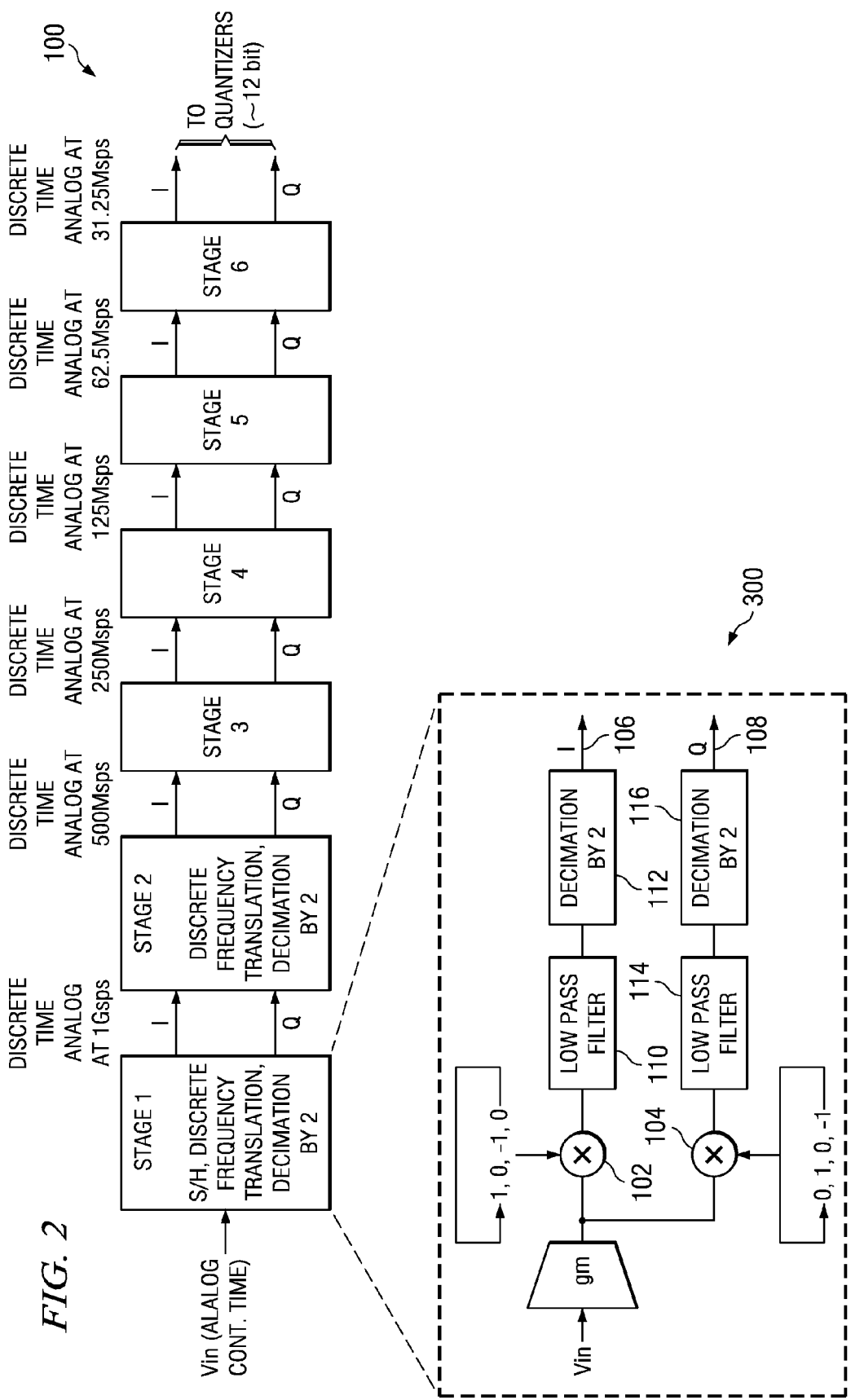
FIG. 2 shows a complex frequency translation process suitable for implementing the frequency translation of the sampled signal shown in FIG. 1b.

FIG. 2 shows a complex frequency translation process 100 suitable for implementing the frequency translation of the sampled signal shown in FIG. 1b. This translation process 100 is achieved by multiplying the input signal by sequences of 1's and 0's and minus 1's. These multiplications represent a rotating vector on the unit circle. It can be seen that stage 1 implements a translation by $\pi/2$. A rotating vector that will translate the input signal by this amount of digital frequency then has the following values: 1, j, $-1$, $-j$, 1, j, $-1$, $-1$, . . . and so forth. The mixer 102, 104 can be implemented via sampling capacitors; and the I and Q paths 106, 108 are achieved by one path always equaling zero when the other is non-zero. If the required translation is by $\pi$, the sequence will become 1, $-1$, $-1$, $-1$, . . . , and so on. The filter and decimation 110, 112, 114, 116 can optionally be combined with the frequency translation into a single (but more complicated) switched capacitor filter such as described herein below with reference to FIGS. 4–5.

Figure 3A:
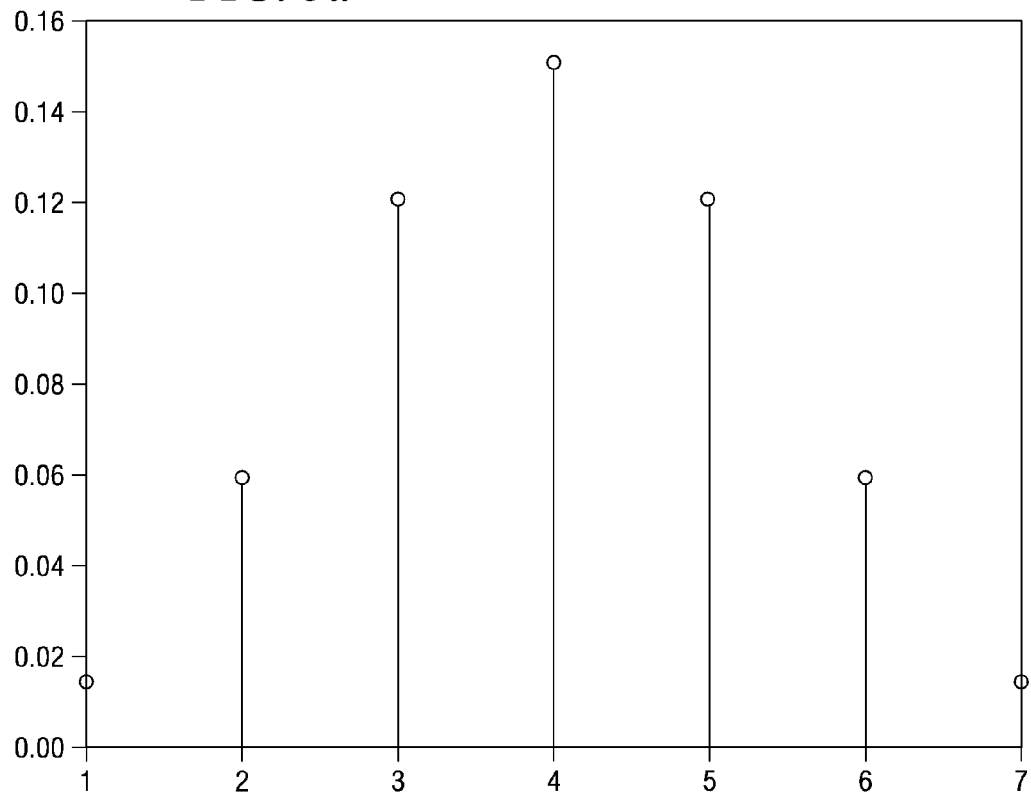
FIG. 3a shows filter coefficients for an FIR filter with 7 taps and that is suitable for implementing the filtering process shown in FIG. 1d.
Figure 3B:
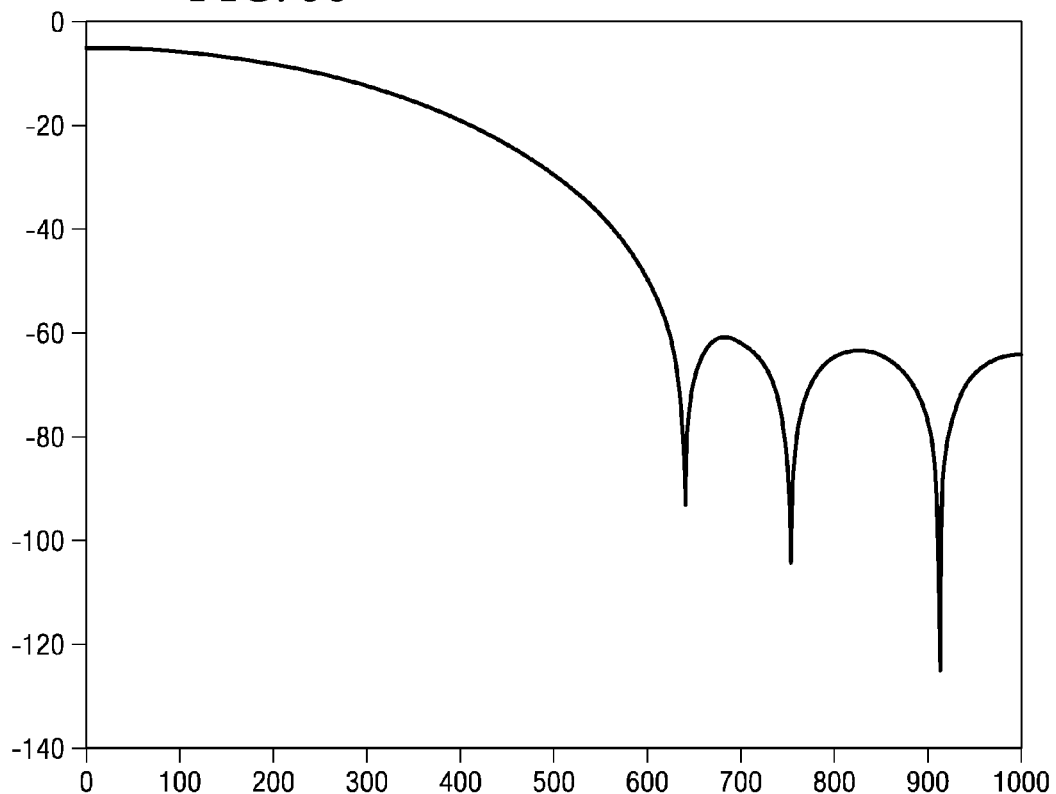

FIGS. 3a and 3b exemplify an FIR filter with 7 taps. FIG. 3a shows the FIR filter coefficients, while FIG. 3b shows the FIR filter frequency response. The vertical axis in FIG. 3b is the rejection in dB; and the horizontal axis is the frequency (1000 stands for Fs/2). This FIR filter is designed to pass the $\pm$ Fs/8 region with nearly no rejection while rejecting regions at or above $7/8F$ by about 60 dB. This same filter is suitable for use in subsequent stages of decimation. The 60 dB was found to be necessary since there are multiple instances of this FIR filter (5–6); and the noise from the tail of the filters may sum up in power. The present inventors found 60 dB per stage will guarantee about 50 dB rejection overall. Those skilled in the art will appreciate that the small variance in the spread of the coefficients will make the filter tolerable to capacitor accuracy.

Figure 4:
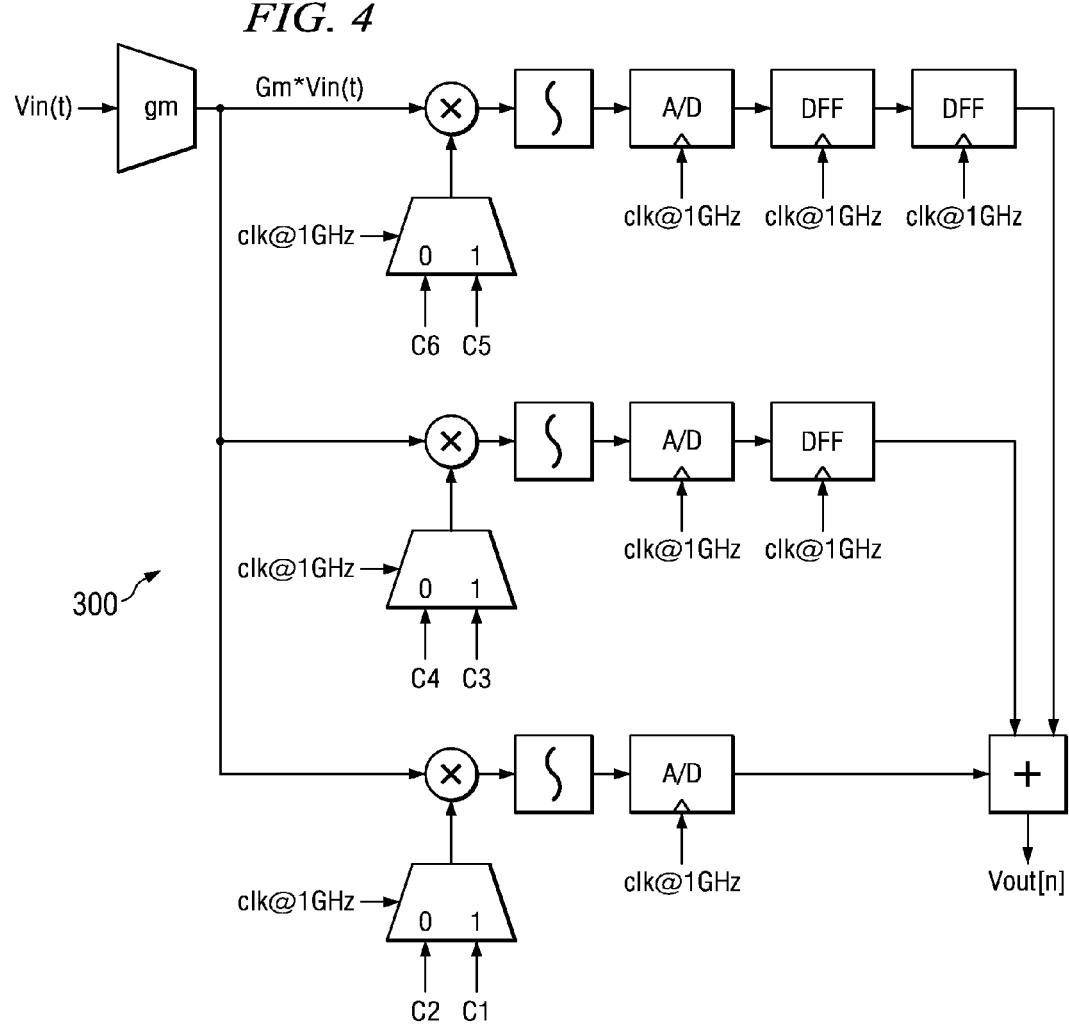
FIG. 4 is a functional block diagram depicting a more detailed view of the complex sub-sampler module shown in FIG. 2.

FIG. 4 is a functional block diagram depicting a more detailed view of the complex sub-sampler module 300 shown in FIG. 2. It can readily be appreciated that the multiplication by Ci values with the integration is analogous to charging the capacitors via an analog scheme. Using a 1 GHz input signal, the minimum sampling rate should be 2 GHz. The desired operation is HB LPF (to prevent aliasing), and then sampling the signal via sampling rate $F_s=1$ Ghz (decimation by factor 2). A mathematical analysis of this scheme is presented herein below wherein $$Vout[n] = Vout(t = nT_s) = \frac{1}{c_1}\int_{(n-\frac{1}{2})T_s}^{nT_s} Vin(\tau)d\tau +$$

$$\frac{1}{c_2}\int_{(n-1)T_s}^{(n-\frac{1}{2})T_s} Vin(\tau)d\tau + \frac{1}{c_3}\int_{(n-1\frac{1}{2})T_s}^{(n-1)T_s} Vin(\tau)d\tau +$$

$$\frac{1}{c_4}\int_{(n-2)T_s}^{(n-1\frac{1}{2})T_s} Vin(\tau)d\tau + \frac{1}{c_5}\int_{(n-2\frac{1}{2})T_s}^{(n-2)T_s} Vin(\tau)d\tau +$$

$$\frac{1}{c_6}\int_{(n-3)T_s}^{(n-2\frac{1}{2})T_s} Vin(\tau)d\tau.$$

Since (for a signal without DC values), $$F\left\{\int_{t-T_2}^{t-T_1} V(\tau)d\tau\right\} = \frac{V(f)}{j2\pi f}(e^{-j2\pi fT_1} - e^{-j2\pi fT_2}),$$

F{Vout} can be written as $$F\{Vout\} = \frac{V(f)}{j2\pi f c_1}\left(1 - e^{-j2\pi f \frac{T_s}{2}}\right) + \frac{V(f)}{j2\pi f c_2}\left(e^{-j2\pi f \frac{T_s}{2}} - e^{-j2\pi fT_s}\right) +$$

$$\frac{V(f)}{j2\pi f c_3}\left(e^{-j2\pi fT_s} - e^{-j2\pi f \frac{3T_s}{2}}\right) +$$

$$\frac{V(f)}{j2\pi f c_4}\left(e^{-j2\pi f \frac{3T_s}{2}} - e^{-j2\pi f2T_s}\right)$$

$$\frac{V(f)}{j2\pi f c_5}\left(e^{-j2\pi f2T_s} - e^{-j2\pi f \frac{5T_s}{2}}\right) +$$

$$\frac{V(f)}{j2\pi f c_6}\left(e^{-j2\pi f \frac{5T_s}{2}} - e^{-j2\pi f3T_s}\right),$$

and $$H(j2\pi f) = \frac{Vout(j2\pi f)}{Vin(j2\pi f)} = \frac{\left(1 - e^{-2\pi f \frac{T_s}{2}}\right)}{j2\pi f}\sum_{k=0}^{5}\frac{1}{\tilde{c}_k}e^{-j2\pi fk\frac{T_s}{2}}$$

$$= \frac{\left(1 - e^{-j2\pi f\tilde{T}_s}\right)}{j2\pi f}\sum_{k=0}^{5}\frac{1}{\tilde{c}_k}e^{-j2\pi fk\tilde{T}_s}$$

$$= \tilde{T}_s\frac{\left(1 - e^{-j2\pi f/\tilde{F}_s}\right)}{j2\pi f/\tilde{F}_s}\sum_{k=0}^{5}\frac{1}{\tilde{c}_k}e^{-j2\pi kf/\tilde{F}_s},$$

while $$\tilde{T}_s = \frac{T_s}{2}, \text{ and } \tilde{C}_k = C_{k+1}.$$

This is analogous to a discrete system sampled at $\tilde{F}_s$=2 GHz:

$$H(e^{jw}) = \tilde{T}_s \frac{(1-e^{-jw})}{jw} \sum_{k=0}^{5} \frac{1}{\tilde{c}_k} e^{-jwk}$$

$$= \tilde{T}_s e^{-jw/2} \frac{(e^{jw/2} - e^{-jw/2})}{jw} \sum_{k=0}^{5} \frac{1}{\tilde{c}_k} e^{-jwk}$$

$$= \frac{\tilde{T}_s}{2} e^{-jw/2} \frac{2j\sin(w/2)}{jw/2} \sum_{k=0}^{5} \frac{1}{\tilde{c}_k} e^{-jwk}, \text{ and}$$

$$H(e^{jw}) = \tilde{T}_s e^{-j\frac{w}{2}} \text{Sinc}\left(\frac{w}{2\pi}\right) \sum_{k=0}^{5} \frac{1}{\tilde{c}_k} e^{-jwk}.$$

Figure 5A:
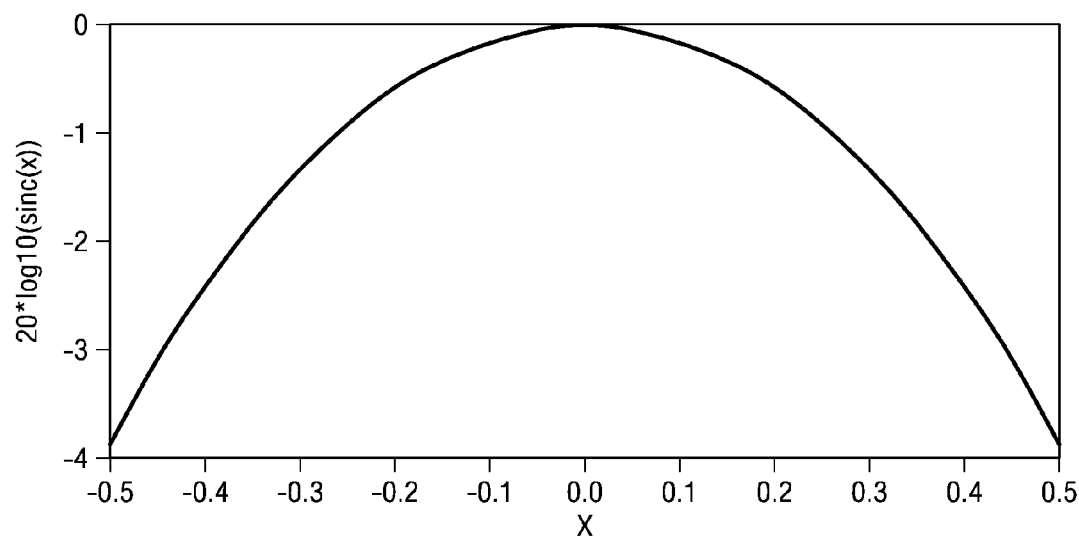
FIGS. 5a and 5b are plots illustrating sinc function values associated with the complex sub-sampler module shown in FIG. 4.
Figure 5B:
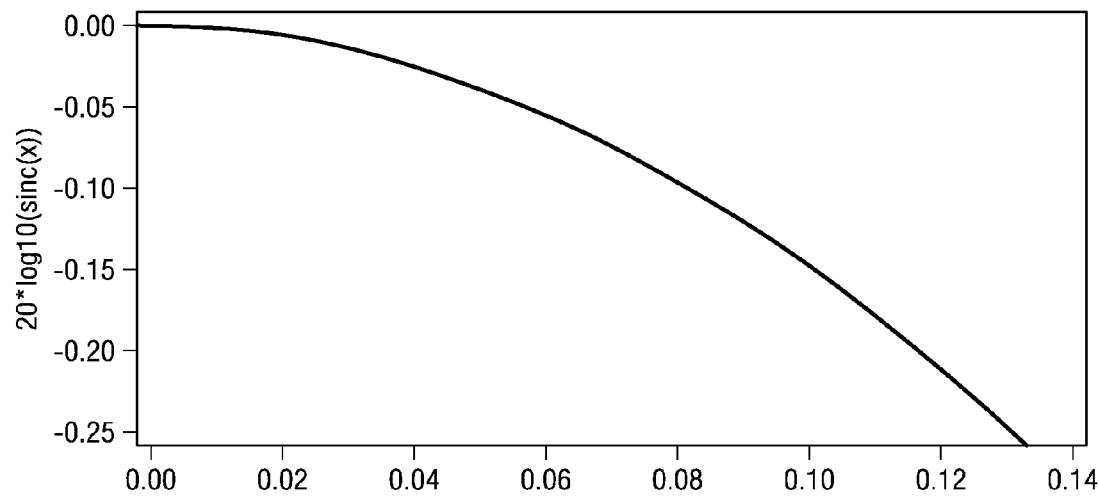

Since $$\text{Sinc}(x) = \frac{\sin \pi x}{\pi x},$$

the sinc function values of interest lie in the range of the center
lobe:

$$w \in [-\pi, \pi] \Leftrightarrow x \in [-1/2, 1/2].$$

as seen in FIGS. 5a and 5b that are plots illustrating sinc function values associated with the complex sub-sampler module shown in FIG. 4. It can be seen from the figures that in the range $$x \in [0, 1/8],$$

which is the desired pass band, there is a maximum degradation of ¼ dB, which is negligible. Therefore, the filter $$\sum_{k=0}^{5} \frac{1}{\tilde{c}_k} e^{-jwk}$$

should be designed as a HB LPF with $$F_p = F_s/8 \text{ and } F_s = 3F_s/8.$$

In view of the above, it can be seen the present invention presents a significant advancement in the RF signal sampling art. It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of sampling an RF input signal, the method comprising the steps of:
   dividing a real RF input signal range into a plurality of regions having equal frequency ranges;
   sampling and holding the RF input signal in discrete time to provide a periodic extension of the original signal spectrum;
   selectively translating the sampled RF input signal and generating a desired signal there from, such that the desired signal lies between − equal frequency range and + equal frequency range;
   filtering the translated RF input signal such that only the desired signal between − equal frequency range and + equal frequency range remains intact; and
   decimating the filtered RF input signal such that a discrete time analog signal is generated at a first sampling rate.

2. The method according to claim 1, wherein the steps of filtering and decimating are repeated until a discrete time analog signal is generated at a desired final sampling rate.

3. The method according to claim 1, wherein the step of selectively translating the sampled RF input signal comprises multiplying the RF input signal by sequences of ones and zeros and minus ones.

4. The method according to claim 1, wherein the step of filtering is implemented via a finite impulse response filter having a sufficient rejection to achieve a desired noise rejection level generated by a predetermined number of translation, filtering and decimation stages.

* * * * *